A. A. BOWSER.
COMBINED METER AND VALVE.
APPLICATION FILED JUNE 19, 1908.

1,079,103.

Patented Nov. 18, 1913.
3 SHEETS—SHEET 2.

Witnesses:

Inventor:
Allen A. Bowser
By Brown & Hopkins
Attys

A. A. BOWSER.
COMBINED METER AND VALVE.
APPLICATION FILED JUNE 19, 1908.

1,079,103.

Patented Nov. 18, 1913.

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

COMBINED METER AND VALVE.

1,079,103.  Specification of Letters Patent.  Patented Nov. 18, 1913.

Application filed June 19, 1908. Serial No. 439,397.

*To all whom it may concern:*

Be it known that I, ALLEN A. BOWSER, a citizen of the United States, residing at Fort Wayne, in the county of Allen and State of Indiana, have invented certain new and useful Improvements in Combined Meters and Valves, of which the following is a specification.

This invention relates to improvements in combined meter and valve particularly adapted for use in connection with liquid supply systems and the primary object of the invention is to provide improved means for measuring and registering the amount of liquid discharged through the meter, and improved means for automatically shutting off the supply of liquid when a predetermined amount has passed through the meter and been discharged through the valve.

A further object is to provide an improved device of this character which will be simple and durable in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention, and in which—

Figure 5:
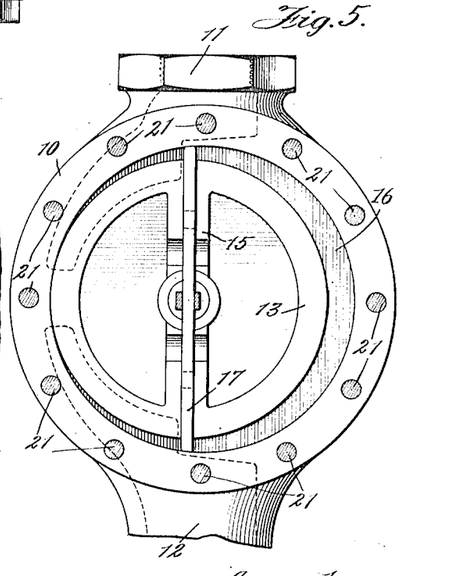
Fig. 5 is a detail sectional view taken on line 5—5 of Fig. 2.

Referring more particularly to the drawings and in the present exemplification of the invention, the numeral 10 designates the barrel or casing of the meter which is preferably cylindrical and has an inlet opening 11 and an outlet opening 12. Rotatably mounted within the casing 10 is a hub or drum 13 which is provided with a suitable bearing 14 in one of the walls of the casing and has a suitable slot 15 through its diameter. This hub or drum is mounted to one side or eccentric to the center of the casing, as shown more clearly in Figs. 5 and 6 of the drawings, thereby providing a communicating liquid passage 16 between the openings 11 and 12. In the exemplification shown in Figs. 1 to 5, a freely movable blade 17 is supported by the hub or drum 13 so as to project through the slot 15 therein and this blade is of a height substantially equal to the height of the drum and of a length greater than the diameter of the drum. The bore of the barrel or casing 10 in each form of the invention is of such a form that when measured through the diameter of the hub or drum 13 in an angular position of the same, the internal distances will always be equal. The length of the freely moving piston preferably in the form of a blade 17 carried by the drum is equal to the internal measurement of the casing on a line through any diameter of the drum so as to always fill the distance without friction or leakage and will have a uniform reciprocating motion through the drum as the latter is rotated. The inlet and outlet openings 11 and 12 of the casing preferably occupy somewhat less than the circumference of the bore of the casing thus allowing the piston blade 17 to cut off a definite amount of liquid from the inlet opening before it begins to discharge the same through the outlet opening while the ordinary pressure of the flowing liquid through the pipe is sufficient to give the drum 13 a rotary motion.

A suitable closure 18 is provided for the casing 10 and passing through a suitable stuffing box 19 supported by the closure 18 is a shaft or axle 20 which is secured in any suitable manner to the drum 13 and for rotation therewith so that the reciprocating movement of the piston blade 17 through the drum will not be interfered with. This closure 18 may be removably secured in position preferably by means of fastening bolts or screws 21 passing through the closure and into the wall of the casing 10. The closure 18 is preferably provided with suitable extensions 22 upon which rests a support 23 which may be secured in position by means of fastening screws or bolts 24. The end of the shaft 20 projects through the support 23 and is provided with gear teeth 25 which latter mesh with one of the gears of a train of gears and pinions 26 mounted on pintles 27, which latter have bearings in the support 23 and a similar support 28 held in position by means of suitable uprights 29 extending above the support 23. A casing 30 is provided for inclosing the gears 26 and this casing is provided with a closure 31 having a series of peripheral graduations 32 and indicating characters 33 corresponding with the graduations to constitute a dial plate. Supported by one of the pintles 27 and within the casing is a bevel gear 34 which meshes with a suitable bevel gear 35 on a shaft 36 of a cyclometer 37, which latter is exposed through a suitable aperture or opening 38 in the dial plate 31. A gear 39 is arranged adjacent the outer face of the dial plate 30 and is provided with an aperture at its diametric center and a hollow cylindrical member 40 is placed over the gear 39. The internal diameter of this member 40 is somewhat greater than the diameter of the gear 39 so as to form a space 41 between the periphery of the gear 39 and the circumferential flange 42 of the member 40.

A pinion 43 is secured to one of the pintles 27 and projects into the space 41 so as to engage the gear 39 and the member 40 is secured to the gear 39 in any suitable manner preferably by means of a fastening pin 44 whereby a rotary motion will be imparted to the member 40 when the gear 39 is rotated. This gear 39 and member 40 may be held in position by means of a hub 45 provided with a reduced portion 46 to form a shoulder. The reduced portion is adapted to be inserted into the aperture at the diametric center of the gear 39 and a similar aperture in the member 40 so that the end of the hub will rest upon the dial plate 31 and the shoulder will engage or stand adjacent the outer face of the member 40. The hub may be held in position in any suitable manner preferably by means of the fastening bolt or screw 47 passing through the hub and engaging the support 28.

An arm 48 is provided with a suitable aperture adjacent one extremity thereof to receive the hub 45 and a washer 49 is interposed between the head of the fastening screw or bolt 47 and the arm 48 to hold the latter against displacement and for rotation upon the hub 45. The other extremity 50 of the arm is depressed or offset as at 50 and the extremity 51 beyond the offset portion is adapted to rest upon the dial face or plate 31. Pivotally supported by one end and to the arm 48 between the upper face of the member 40 and the lower face of the arm, as at 52, is a bell crank lever 53. This arm of the lever is of a length to project beyond the periphery of the member 40 and journaled to the arm adjacent the periphery of the member 40 is an anti-friction or clutch roller 54. The offset portion 50 of the arm 48 is provided with an inclined face or wall 55, shown more clearly in Fig. 4 of the drawings, and in dotted lines in Fig. 1, and this wall or face 55 is spaced from the periphery of the member 40 a sufficient distance at one end to permit the clutch roller 54 to be moved freely in the space therebetween and out of engagement with the periphery of the member 40. The other extremity of the wall 55 is located at such a distance from the periphery of the member 40 that when the anti-friction or clutch roller 54 is forced toward said end, the arm 48 will be frictionally locked to the member 40 for rotation therewith. The other arm 56 of the bell crank lever preferably projects beyond one side of the arm 48 and is provided with an operating knob or handle 57 by means of which the clutch roller 54 may be adjusted to lock or unlock the arm 55 with respect to the member 40. A suitable elastic member, such as a coil spring 58 under compression, is provided for normally tending to hold the roller 54 in position to lock the arm 48 and the member 40. One end of this spring 58 is adapted to be seated in a suitable recess in the arm 48 and the other extremity is seated within a suitable recess in the arm 56 of the bell crank lever. The extremity of the arm 48 adjacent the end 51 is provided with an index or pointer 59 adapted to coöperate with the graduations 32 on the dial plate and an aperture 60 is provided in the arm adjacent the pointer through which the indications 33 are adapted to be exposed. This end of the arm 48 is also provided with an extension 61 which preferably projects beyond the index 59 for a purpose to be hereinafter set forth.

The barrel or casing 10 is provided adjacent the outlet end 12 with a valve seat 62 with which a suitable valve 63 coöperates. The valve 63 is provided with a depending stem 63$^a$ which is adapted to move in a guide 64 located within a recess 64$^a$ in a cap 64$^b$ which latter is located below the valve seat 62 and an elastic member 65 preferably in the form of a coil spring under compression is seated within the recess 64$^a$ so as to surround the guide and stem with one extremity resting against the body of the recess and the other extremity rests against the lower face of the valve 63 and tends normally to force the valve toward its seat 62. The cap 64$^b$ is provided with an aperture 64$^c$ which opens through one extremity thereof below the stem 63$^a$, and a suitable closure 64$^d$ may be provided for this aperture. A suitable port or passage 64ᵉ may be provided which has communication with the aperture 64ᶜ and the recess 64ᵃ by means of which any oil or liquid which may enter the aperture 64ᶜ may be discharged therefrom and into the recess 64ᵃ when the valve is moved. The valve 63 is also provided with a stem 63ᵇ which projects beyond the opposite face thereof and an operating stem 65' is preferably provided with a recess 65ˣ in one extremity adapted to receive the extremity of the stem 63ᵇ. This stem 65 projects through one side of the valve casing and through a suitable stuffing box 65ᵃ and the free extremity 65ᵇ passes through a suitable guide 65ᶜ supported by the casing. The extremity 65ᵇ of the stem 65 is reduced as shown to form a shoulder 66 and secured to the stem above the stuffing box 65ᵃ and remote from the shoulder 66 is a sleeve or collar 67.

A lever 68 is pivotally supported by one extremity as at 69 to a support 70 from which latter the bearing 65ᶜ projects and this lever 68 is preferably bifurcated as at 71 adjacent its pivoted extremity and through which bifurcation the stem 65 projects. The lever is provided with a depending portion 72 adjacent its pivot 69 and the lever is arranged above the collar or sleeve 67 so that the depending portion 72 will engage the sleeve or collar 67 when the valve 63 is seated to permit the valve to be unseated by the lever against the tension of the elastic member 65 when the lever is depressed. If desired, a suitable elastic member 73 in the form of a coil spring under tension may be secured by one extremity to the upright or support 70 and by the other extremity to the lever 68 for normally holding the latter raised to permit the valve to be seated without causing the sleeve or collar 67 to engage the depending projection 72. A locking lever 73ᵃ is pivotally supported intermediate its ends on the support 70 and this lever is adapted to be moved into the path of the return movement of the shoulder 66 on the stem 65 when the latter is depressed by the lever 68 so as to hold the valve 63 open.

Figure 1:
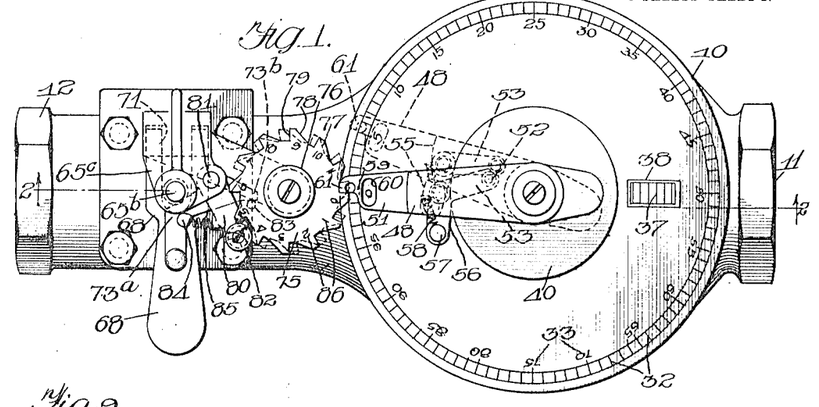
Figure 1 is a top plan view of an improved device of this character constructed in accordance with the principles of this invention.
Figures 2, 9:
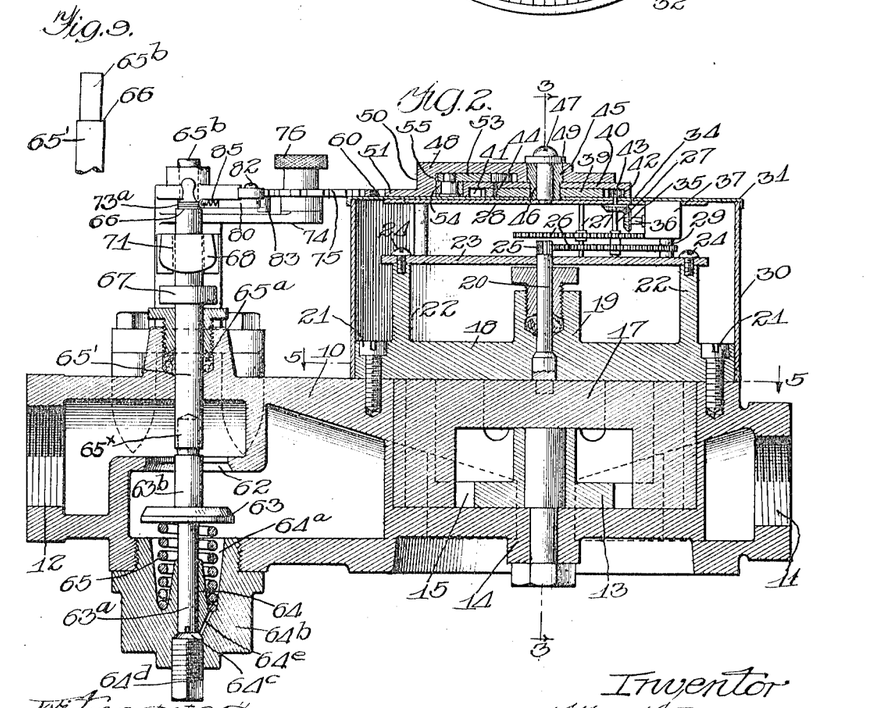
Fig. 2 is a view partly in elevation and partly in section, taken on line 2—2 of Fig. 1.
Fig. 9 is a detail view of one extremity of the valve stem.
Figure 3:
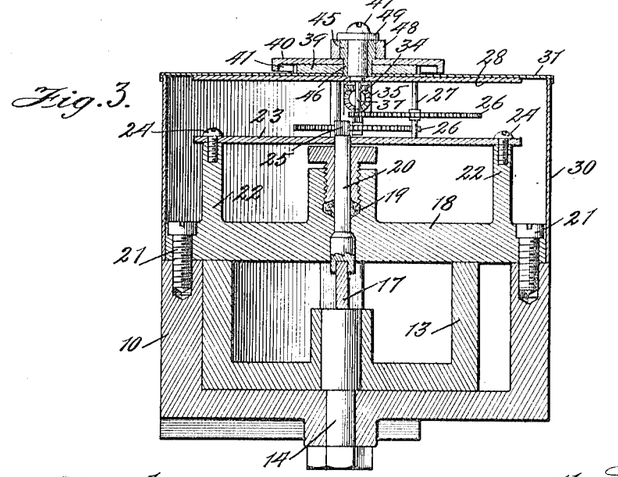
Fig. 3 is a sectional view taken on line 3—3 of Fig. 2.
Figure 4:
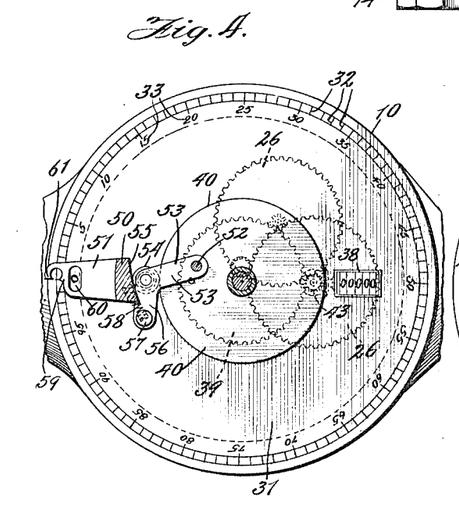
Fig. 4 is a detail top plan view of the meter, partly in section and showing in dotted lines the gearing for operating the releasing arm for the valve.

A supplemental dial or indicator 75 is rotatably supported upon the bracket 74 and is provided with an operating handle or knob 76 by means of which it may be freely rotated at will. This supplemental dial or indicator is provided with a plurality of spaced peripheral teeth 77, each of which is provided with an inclined portion 78 adapted to coöperate with a straight portion 79. A locking dog or pawl 80 is pivotally supported upon the bracket 74 preferably by means of a pin or bolt 81 which latter also forms the pivot for the arm or lever 73ᵃ. An anti-friction roller 82 is journaled to the free end of the dog or pawl 80 and is adapted to engage between two of the adjacent peripheral teeth of the supplemental dial or indicator 75 for locking the latter in position. Depending from the lower face of this dial or indicator is a pin or projection 83 which is adapted to engage a projecting portion 73ᵇ of the arm or lever 73ᵃ when the dial or indicator is rotated so as to rock the arm or lever 73ᵃ about its point of pivotal support and move the same from engagement with the shoulder 66 to release the valve 63 and permit the latter to be automatically seated by the elastic member 68. A suitable elastic member 85, such as a coil spring under compression or the like, is provided and one end thereof engages in a suitable socket 84 of the arm or lever 73ᵃ and the other end in a similar socket 80ᵃ in the dog or pawl 80, whereby said members may be yieldingly held in operative position. The supplemental dial or indicator 75 is provided with a series of indicating characters 86, one for each of the peripheral teeth 77 and the dial is located adjacent the zero graduation on the dial plate 31 and in such a position that the peripheral teeth 77 will project into the path of movement of the extension 61 on the arm 48. The anti-friction roller 82 is adapted to engage the inclined portions 78 of the teeth 77 in such a manner as to cause when the index or pointer 59 of the arm 48 is moved from the zero position, the zero tooth 77 to stand over the zero graduation of the dial plate 31, thereby necessitating the movement of the supplemental dial or indicator 75 in order to permit the index or pointer 59 to assume the zero position, the pin 83 being so located with relation to the zero tooth of the supplemental dial or indicator that when such a movement is imparted to the dial the pin will engage the extremity 73ᵇ of the lever 73ᵃ and rock the latter against the tension of the elastic member 85. As shown by Figs. 1 and 2, the members are in the zero position with the valve 63 open, and any further rotation or operative movement of the arm 48 will cause the indicator 75 to be engaged and rotated so that the pin 83 will engage the lever 73ᵃ and move it out of contact with the shoulder 76 of the valve operating stem 65¹ whereby the spring will close the valve.

In use the arm 48 may be adjusted to any desired position so as to indicate any predetermined amount of liquid on the dial plate 31 and when the arm is thus adjusted the supplemental dial or indicator will assume the position above referred to, that is, with the zero tooth over the zero graduation on the dial plate 31. This adjustment of the arm is accomplished by releasing the clutch roller 54 in the manner already set forth and when properly adjusted the clutch roller will automatically lock the member 40 and the arm 48. When thus adjusted the liquid passing into the inlet opening 11 of the casing of the meter, the hub thereof will be rotated in the manner already described so as to impart motion to the train of gears 26 which will also rotate the member 40 as well as the cyclometer 37. When the extremity 61 of the arm 48 engages the tooth of the supplemental dial or indicator 75 the latter will be moved to release the valve 63 which will shut off the discharge of liquid. Should it be desired to discharge a larger quantity of liquid than is indicated by the dial 31, the arm 48 may be first adjusted in the manner already set forth and then the supplemental dial or indicator 75 may be rotated by means of the knob or handle 76 until the tooth thereon bearing the character designating the desired amount of liquid is placed in a position over the zero graduation on the dial 31; for example, if it is desired to discharge one hundred and five gallons of liquid, the arm 48 will be first adjusted until the graduation "5" of the series 33 is displayed through the aperture 60 in the arm and then the supplemental dial or indicator 75 may be adjusted until the tooth bearing the indication "1" stands above the zero graduation on the dial 31. Thus adjusted and with the valve 63 open, the hub 76 will be rotated as the liquid passes therethrough and cause the extension 61 to move toward the zero point at which time it will engage the tooth designated by the numeral "1" and will impart one step of rotation to the supplemental dial 75 after which the arm 48 will traverse the entire dial 31 until the extension 61 again approaches the zero point, at which time it will impart a second step of rotation to the supplemental dial or indicator to trip the valve.

Obviously the capacity of the meter may be extended to discharge any desired amount within the capacity of the supplemental dial or indicator which may be accomplished by adjusting the latter so as to increase the number of rotations which the arm 48 must make around the dial 31 before the extension 61 engages the zero tooth of the supplemental dial to release the valve.

Figure 6:
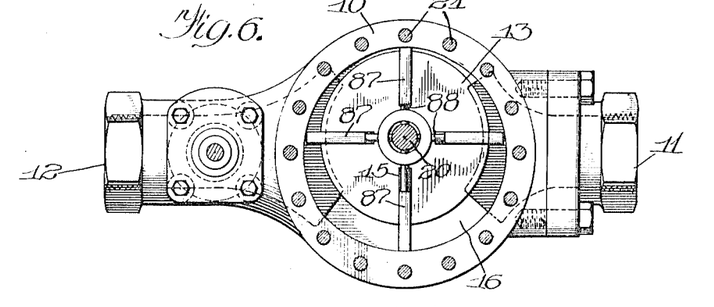
Fig. 6 is a sectional view on line 6—6 of Fig. 7, showing a modified form of meter.
Figure 7:
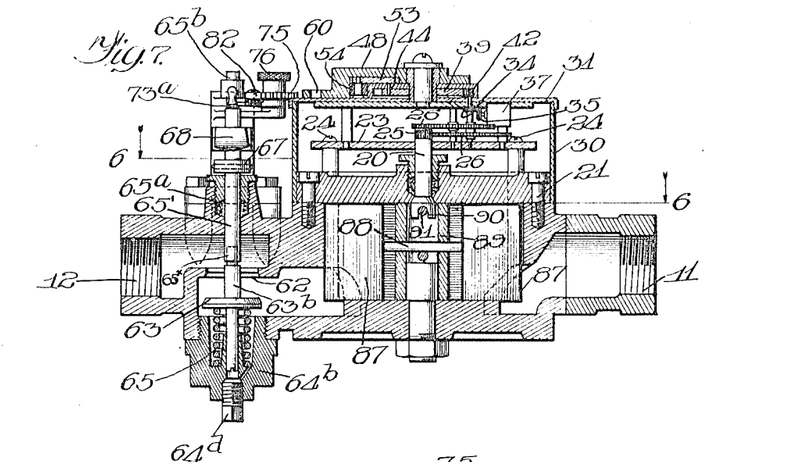
Fig. 7 is a longitudinal sectional view, partly in elevation, of the modified form of meter.
Figure 8:
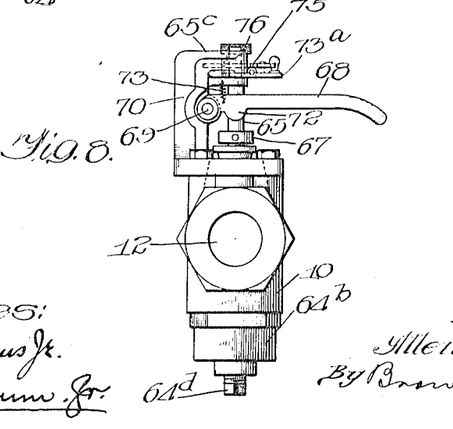
Fig. 8 is a detail left hand end elevation of Fig. 7.

In the exemplification of the invention shown in Figs. 6 and 7, the meter is preferably provided with a plurality of oppositely disposed piston blades 87, preferably 4 in number, which are arranged diametrically opposite each other so as to move in oppositely disposed slots 15. These piston blades 87 are adapted to project beyond the periphery of the drum 13 in a manner similar to that shown in Fig. 5 of the drawings but in this exemplification of the invention the diametrically oppositely disposed blades are preferably separate from each other and disposed between each pair of blades is a member 88, which is of a length to engage the adjacent or inner edges of the piston blades 87. These members 88 are preferably arranged at right angles to each other and at substantially the longitudinal center of the blades and project through the hub 89 of the drum 13 so that when one of the blades 87 of each pair engages the adjacent wall of the barrel or casing 10 to be forced within the respective slot in the drum 13, the diametrically opposite piston blade 87 will be forced out of its respective slot in the drum and into engagement with the diametrically opposite portion of the wall of the barrel or casing so as to form an obstruction projecting across the space 16 within the barrel or casing and between the inner wall thereof and the periphery of the drum, which obstruction is engaged by the inflowing fluid and will be advanced by the pressure of the fluid to cause the drum 13 and the remaining piston blades 87 to be revolved. In this exemplification of the invention the shaft 20 may be connected to the drum 13, preferably by means of its bifurcated extremity 90 to project into the hollow hub 89 of the drum 13 and engaging over a transversely disposed member 91 extending across and within the hub. It will also be apparent that with this improved construction the efficiency and capacity of the meter will be increased.

By the term piston element is meant a complete unit loosely mounted in the hub and adapted to be directed longitudinally, when the hub is rotated, by engagement with the eccentric wall of the casing or barrel to project the ends alternately beyond opposite sides of the hub. In the form shown in Fig. 5 the piston element is shown as a single and continuous member, while in Fig. 6 the piston element is shown as being composed of a plurality of spaced sections between the adjacent ends of which is arranged a member, which latter engages adjacent extremities of the sections, thereby making the piston element substantially continuous.

In order that the invention might be fully understood the details of the foregoing embodiment thereof have been thus specifically described, but

What I claim as new is—

1. The combination of a meter, a valve controlled by the meter and having a bias toward closing, means for holding the valve open, a capacity tripping mechanism for releasing the valve when a predetermined quantity has passed the meter, said mechanism embodying an element movable in a continuous orbit in unison with the meter, and a trip member whereby the valve will be released when said element reaches a predetermined point in its orbit, said trip member also operating to cause said element to pass said point one or more times at will without releasing the valve.

2. The combination of a meter, a valve controlled by the meter, means for holding the valve unseated, a capacity tripping mechanism for releasing the valve when a predetermined quantity has passed the meter, said mechanism embodying an element movable in a continuous orbit in unison with the meter, a trip member whereby the valve will be released when said element reaches a predetermined point in its orbit, and means for seating the valve when the latter is released.

3. The combination of a meter, a valve controlled by the meter, a stem for the valve, said stem being provided with a plurality of shoulders, means tending normally to hold the valve closed, a lever adapted to engage one of the shoulders to longitudinally shift the stem to open the valve against the tension of the last said means, a locking member adapted to engage another shoulder to hold the valve open, and means operatively related to the meter and adapted to engage and move the locking member to release the valve when the last said means reaches a predetermined point.

4. The combination of a meter, a valve controlled by the meter, a stem for the valve, said stem being provided with a plurality of shoulders, means tending normally to hold the valve closed, a lever adapted to engage one of the shoulders to open the valve against the tension of the last said means, a locking member adapted to engage another shoulder to hold the valve open, tripping mechanism including means operatively related to the meter and an element adapted to be engaged by the last said means to move the locking member when the last said means reaches a predetermined point, and means whereby the said element may be adjusted to cause the second recited means to pass said point one or more times at will without releasing the valve.

5. The combination of a meter, an indicator dial, means operatively related to the meter and adapted to be adjusted with respect to the dial to indicate a predetermined amount within a certain capacity limit, means whereby the operation of the meter will move the last said means from its adjusted position, a valve controlled by the meter and having a bias toward closing, means for holding the valve open, and means controlling the capacity limit of the meter embodying means operable by the first said means for automatically releasing the valve when the predetermined quantity has been discharged.

6. The combination of a meter, an indicator dial, means operatively related to the meter and adapted to be adjusted with respect to the dial to indicate a predetermined amount within a certain capacity limit, means whereby the operation of the meter will move the last said means from its adjusted position, a valve controlled by the meter and having a bias toward closing, means for holding the valve open and means embodying the first said means for controlling the capacity limit of the meter and also embodying means adapted to engage and trip the valve holding means to release the valve when a predetermined amount has been discharged.

7. The combination of a meter, an indicator dial, means adapted to be adjusted with respect to the dial to indicate a predetermined amount within a certain capacity limit, means whereby the operation of the meter will move the last said means from its adjusted position, a valve for controlling the meter, mechanism for holding the valve open and mechanism controlled by the last said means for automatically releasing the valve when a predetermined amount has been discharged, the last said mechanism including a supplemental dial, means whereby said dial may be adjusted to control the capacity limit of the meter, and yielding means for locking the dial in its adjusted position.

8. The combination of a meter, an indicator dial, means adapted to be adjusted with respect to the dial to indicate a predetermined quantity within a certain capacity limit, means whereby the movement of the meter will move the last said means from its adjusted position, a valve controlled by the meter, means embodying the first said means for controlling the capacity limit of the meter, the last said means embodying means for automatically controlling the valve when a predetermined quantity has been discharged, and a register for registering the total amount of liquid passed through the meter.

9. The combination of a meter including a movable element, an indicator, a member movable independently of the element, said member coöperating with the indicator and adapted to be adjusted with respect thereto to indicate a predetermined amount within certain capacity limits, means for causing the member to move with the said element and from its adjusted position, a valve controlled by the meter and having a bias toward closing, a supplemental dial for controlling the said capacity limit, means for holding the valve open, and means operatively related to the dial for releasing the valve when the dial is moved by the first said member as it passes a predetermined point in its movement with the meter element, said dial being also movable independently one or more times by the said member without releasing the valve.

10. The combination of a meter, including a movable element, an indicator, a member coöperating with the indicator and movable independently of the element in one direction to indicate a predetermined amount within certain capacity limits, a friction clutch for locking the member for movement with the said element in the opposite direction, a valve controlled by the meter and having a bias toward closing, means for holding the valve open, and controlling mechanism for the valve, said mechanism including a tripping member whereby the valve will be released when the first said member passes a predetermined point in its movement, the said tripping member also operating to cause the first said member to pass said point one or more times without releasing the valve.

11. The combination of a meter, including a movable element, an indicator, a member coöperating with the indicator and movable independently of the element in one direction to indicate a predetermined amount within certain capacity limits, a friction clutch for locking the member for movement with the said member in the opposite direction, a valve controlled by the meter and having a bias toward closing, means for holding the valve open, controlling mechanism for the valve, said mechanism including a tripping member whereby the valve will be released when the first said member passes a predetermined point in its movement, means whereby the first said member may be allowed to pass said point one or more times without releasing the valve, and means for releasing the clutch to permit the last recited member to be operated independently of the said movable element.

12. The combination of a meter including a movable element, an indicator, a member coöperating with the indicator and movable independently of the element in one direction to indicate a predetermined amount within certain capacity limits, means for automatically locking the member for movement with the said element in the opposite direction, a valve controlled by the meter and having a bias toward closing, means for holding the valve open, and controlling mechanism for the valve, said mechanism including a tripping member whereby the valve will be released when the first said member passes a predetermined point in its movement, the last recited member also operating to pass said point one or more times without releasing the valve.

13. The combination of a meter, a movable element, an indicator coöperating with said element, means permitting adjustment of the element to a predetermined position within a certain capacity limit, means for causing the said element to move with the meter and away from its adjusted position, a supplemental element for controlling the capacity limit, means for adjusting the supplemental element independently of the first said element, means for yieldingly holding the supplemental element in its adjusted position, said supplemental element being provided with spaced teeth adapted to be successively projected into the path of movement of the first said element to be engaged thereby, a valve controlled by the meter, and means operatively related to the said supplemental element for automatically controlling the valve.

14. The combination of a meter, an indicator provided with a plurality of characters arranged to respectively designate capacity limits, an element operatively related to the meter and coöperating with said indicator, means whereby the element may be adjusted to one of the characters, a supplemental element for controlling the said capacity limit, means for adjusting the supplemental element independently of the first said element, means for causing the first said element to move with the meter and away from its adjusted position, means coöperating with the said supplemental element for compelling the movement of the supplemental element by the first said element before the latter reaches a certain one of the characters on its return movement, a valve controlled by the meter, and means influenced by the movement of the supplemental element for operating the valve controlling mechanism.

15. The combination of a meter, an indicator provided with a plurality of characters arranged to respectively designate capacity limits, an element operatively related to the meter and coöperating with the said indicator, means whereby the element may be adjusted to one of the characters, a supplemental element for controlling the capacity limit, means for adjusting the supplemental element independently of the first said element, means for causing the first said element to move with the meter and away from its adjusted position, means coöperating with the said supplemental element for compelling the movement of the supplemental element by the first said element before the latter reaches a certain one of the characters on its return movement, a valve controlled by the meter, and means influenced by the movement of the supplemental element for operating the valve controlling mechanism, said supplemental element also operating to cause the first said element to pass said character one or more times without operating the valve controlling mechanism.

16. The combination of a meter comprising a casing having a substantially cylindrical bore and provided with an inlet and an outlet, a rotatable hub eccentrically mounted within the casing, said hub being of a diameter somewhat smaller than the diameter of the said bore and having a slot through the diametrical center thereof, a piston element supported by the hub and freely movable through the slot, said piston element being of a length substantially equal to the diameter of the bore of the casing and of a width substantially equal to the length of the hub, said hub being rotated by the fluid passing through the casing, a valve controlled by the meter, means for controlling the valve, and means operatively related to the hub for automatically controlling the last recited means.

17. A meter comprising in combination a cylindrical casing having an inlet and an outlet, a rotatable liquid driven member within the casing and provided with a hub, a dial, a cylindrical member adjacent the face of the dial, an operative connection between the said member and the hub for rotating the former, an indicator member coöperating with the dial and mounted for independent rotation with respect to the cylindrical member, said indicator member being provided with a face adjacent the periphery of the other said member, means supported by one of the members and adapted to engage the adjacent faces of the members to frictionally lock the members for rotation together, a valve controlled by the meter, and means operatively related to the indicator member for automatically controlling the valve.

18. A meter comprising in combination a cylindrical casing having an inlet and an outlet, a rotatable liquid driven member within the casing, a dial, a cylindrical member adjacent the face of the dial, an operative connection between the two members for rotating the former, an indicator member coöperating with the dial and mounted for independent rotation with respect to the said cylindrical member, said indicator member being provided with an inclined face adjacent the periphery of the said cylindrical member, a locking member, means for supporting the member, means tending normally to hold the locking member between the adjacent faces of the two said members to lock them for movement together, a valve controlled by the meter, and means operatively related to the indicator member for automatically controlling the valve.

19. A meter comprising in combination a cylindrical casing having an inlet and an outlet, a rotatable liquid driven member within the casing, a dial, a cylindrical member adjacent the face of the dial, an operative connection between the two members for rotating the former, an indicator member coöperating with the dial and mounted for independent rotation with respect to the said cylindrical member, said indicator member being provided with an inclined face adjacent the periphery of the said cylindrical member, a locking member, means for supporting the member, means tending normally to hold the locking member between the adjacent faces of the two said members to lock them for movement together, means for displacing the locking member to release the indicator member to permit an independent movement thereof, a valve controlled by the meter, and means operatively related to the indicator member for automatically controlling the valve.

20. In a meter, the combination of a casing or barrel provided with an inlet and outlet, a rotatable hub eccentrically mounted within the casing and of a diameter smaller than the diameter of the casing, a plurality of pairs of piston elements loosely supported by the hub, each of said piston elements embodying sections arranged diametrically opposite to each other and disposed to project beyond the periphery of the hub to engage the wall of the casing, said hub being rotated by the fluid passing through the barrel or casing and engaging the piston elements, and means connecting the diametrically opposite sections of the piston elements whereby they will be substantially continuous and will act in unison.

21. In a meter, the combination of a casing or barrel provided with an inlet and an outlet, a rotatable hub eccentrically mounted within the casing and of a diameter smaller than the diameter of the casing, a plurality of piston elements, each element comprising a pair of sections loosely supported by the hub, said sections being arranged diametrically opposite to and spaced from each other, and a member supported by and extending transversely of the hub between the coöperating sections, and engaging the adjacent extremities of the sections whereby the sections constituting the respective elements will be substantially continuous and will act in unison, said sections being disposed to project beyond the periphery of the hub to engage the wall of the casing, said hub being rotated by the fluid passing through the barrel or casing and engaging the said elements.

22. The combination of a meter, embodying quantity graduations, means operating with the meter and adapted for adjustment with respect to the graduations to indicate a predetermined amount within certain capacity limits and movable from the adjusted position by the meter, a valve having a bias toward closing, means for holding the valve open, and means operable to trip the valve holding means, the tripping means being separate from and freely movable with respect to the valve holding means, said tripping means being also operable by the first recited means.

23. The combination of a meter, embodying quantity graduations, means operating with the meter and adapted for adjustment with respect to the graduations and meter, to indicate a predetermined amount within certain capacity limits and movable from the adjusted position by the meter, a valve having a bias toward closing, means for holding the valve open, and means operable to trip the valve holding means, the tripping means being separate from and freely movable with respect to the valve holding means, said tripping means being also operable by the first recited means.

24. The combination of a meter, embodying quantity graduations, means operating with the meter and adapted for adjustment with respect to the graduations to indicate a predetermined amount within certain capacity limits and movable from the adjusted position by the meter, a valve having a bias toward closing, means for holding the valve open, and means operable to trip the valve holding means, the tripping means being separate from and freely movable with respect to the valve holding means and also with respect to the first recited means, said tripping means being also operable by the first recited means.

25. The combination of a meter, embodying quantity graduations, means operating with the meter and adapted for adjustment with respect to the graduations to indicate a predetermined amount within certain capacity limits and movable from the adjusted position by the meter, a valve having a bias toward closing, means for holding the valve open and means operable to trip the valve holding means, the tripping means being separate from and freely movable with respect to the valve holding means, said tripping means being also operable by the first recited means, and adapted to be moved one or more times thereby without tripping the valve.

26. The combination in a meter comprising a casing having a substantially cylindrical bore and provided with an inlet and an outlet, a rotatable hub eccentrically mounted within the casing, said hub being of a diameter somewhat smaller than the diameter of the said bore and diametrically slotted therethrough, a piston element supported by the hub and freely movable through the slot, said piston element being of a length substantially equal to the diameter of the bore of the casing and of a width substantially equal to the length of the hub, said hub being rotated by the fluid passing through the casing.

In testimony whereof I have signed my name to this specification, in the presence of two subscribing witnesses, on this 13th day of June A. D. 1908.

ALLEN A. BOWSER.

Witnesses:
JOHN L. HANDY,
J. R. MATLACK.